United States Patent [19]
Genous-Moore

[11] Patent Number: 6,122,853
[45] Date of Patent: Sep. 26, 2000

[54] NITE LITE FISH STRIKE INDICATOR

[76] Inventor: Christine Genous-Moore, 617 Chisholm La., Suffolk, Va. 23434

[21] Appl. No.: 09/274,289

[22] Filed: Mar. 22, 1999

[51] Int. Cl.$^7$ ........................... A01K 85/01; A01K 87/00
[52] U.S. Cl. .................................. 43/17.5; 43/17; 43/25; 362/109; 362/102
[58] Field of Search ................................ 43/25, 17, 17.5, 43/18.1; 362/109, 102

[56] References Cited

U.S. PATENT DOCUMENTS

| | | |
|---|---|---|
| 3,862,509 | 1/1975 | Petersen, Jr. . |
| 4,026,059 | 5/1977 | Ochs . |
| 4,479,321 | 10/1984 | Welstead . |
| 4,505,063 | 3/1985 | Price et al. . |
| 5,179,797 | 1/1993 | Edwards et al. ........................ 43/17.5 |
| 5,205,061 | 4/1993 | Echols, Jr. ................................ 43/17.5 |
| 5,276,990 | 1/1994 | Ramirez ................................... 43/17.5 |
| 5,566,493 | 10/1996 | Minorics ................................... 43/17.5 |
| 5,586,403 | 12/1996 | Ward ........................................ 43/17.5 |
| 5,644,864 | 7/1997 | Kelly ........................................ 43/17.5 |
| 5,738,433 | 4/1998 | Sparks ..................................... 362/109 |
| 5,913,671 | 6/1999 | Fernandez et al. ...................... 43/18.1 |
| 6,000,808 | 12/1999 | Hansen ................................... 362/109 |

*Primary Examiner*—Michael J. Carone
*Assistant Examiner*—James S. Bergin
*Attorney, Agent, or Firm*—Lloyd A. Ormon

[57] ABSTRACT

A lightweight, portable fish strike indicator for use with a fishing rod to provide a visible indication of the movement of the rod tip especially during low ambient light conditions. The fish strike indicator includes a high intensity light source, which transmits light through an optical fiber to the tip portion of a fishing rod. The motion of the tip during and after a fish strike are translated in to a visible light trace whose arc length and oscillation frequency are proportional to the force of the strike and provides an indication whether the fish has been hooked. The high intensity light source along with the optical fiber extending to the tip of the rod can be easily attached to or removed from the outer surface of the shaft of a fishing rod, or may be imbedded inside the shaft as a more permanent accessory.

7 Claims, 3 Drawing Sheets

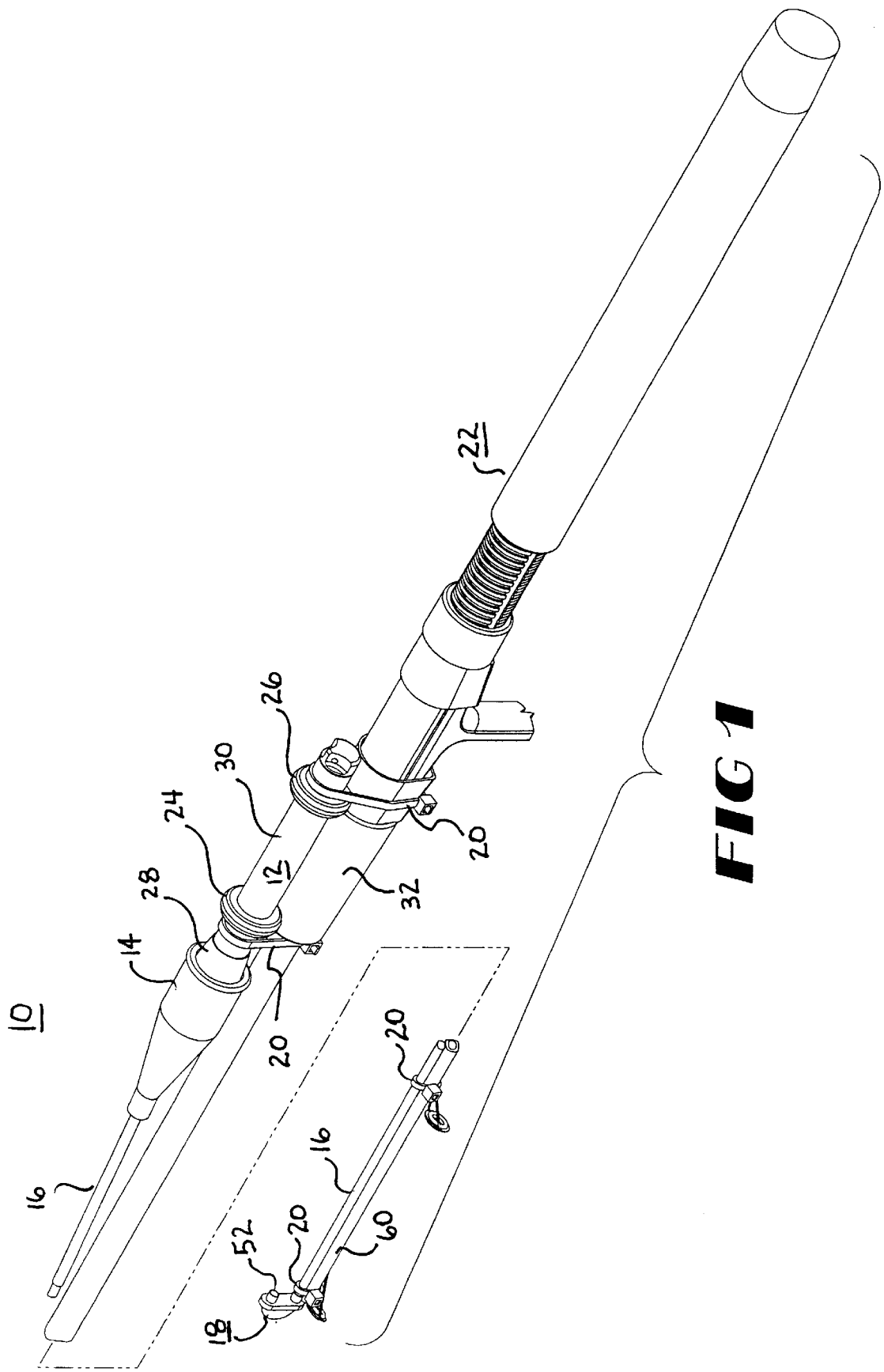

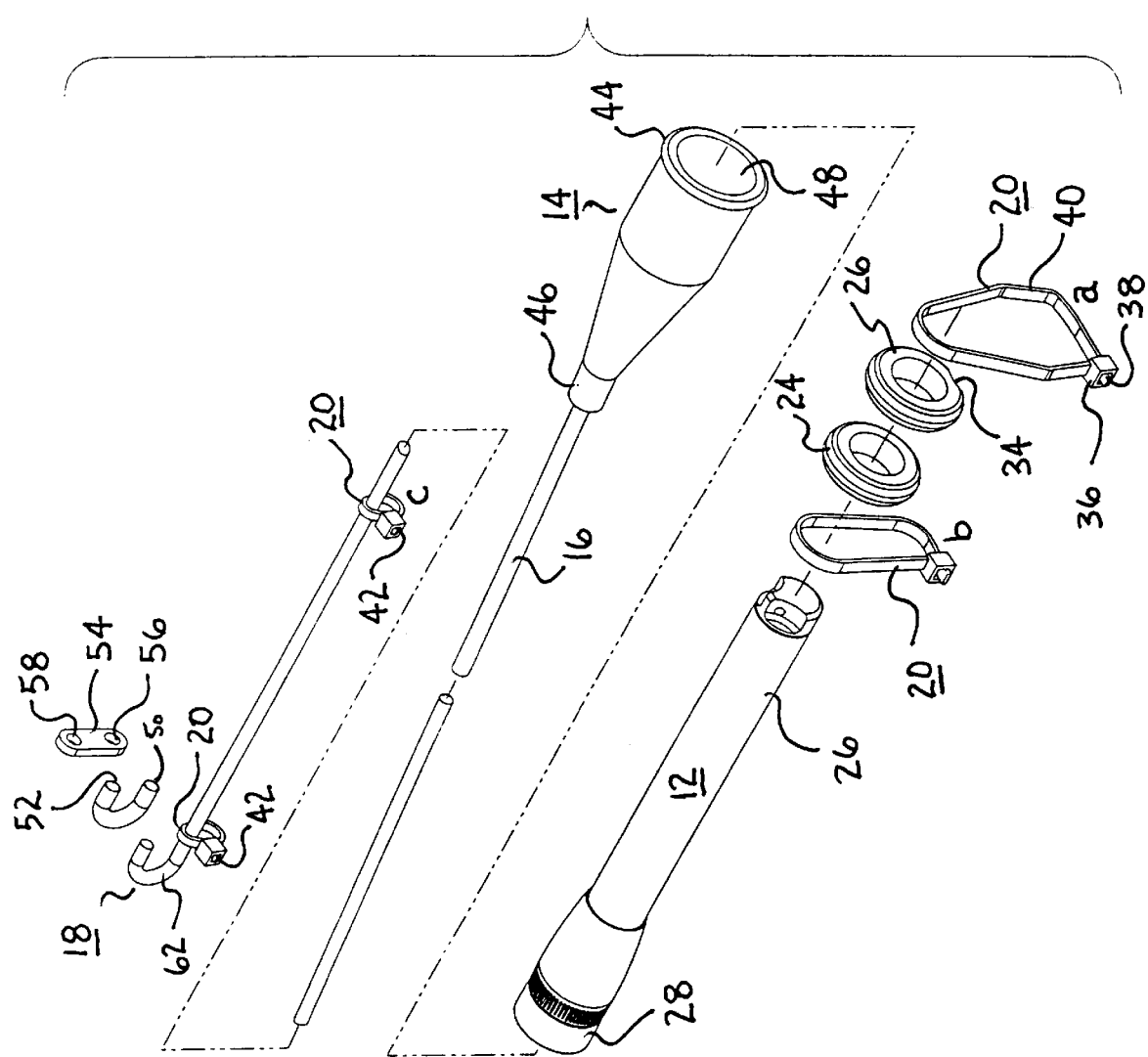

NITE LITE FISH STRIKE INDICATOR

BACKGROUND OF THE INVENTION

This invention relates generally to providing an indication to fishermen of a fish strike, and more particularly to an attachment to a fishing rod to provide an indicator light at the end of a fishing pole which reacts to a fish strike. This invention is especially useful for fishing during low ambient light conditions when there is little or no contrast between the fishing rod tip and its surrounding environment, making it difficult to observe motion of the rod tip. The fish strike indicator is a lightweight, portable device that can readily be attached or removed from the fishing rod.

SUMMARY OF THE INVENTION

The portable lightweight fish strike indicator of the present invention provides a positive indication of a fish strike especially during low ambient light conditions or when observing a rod from several feet away. Fisherman have often found it very difficult to observe the motion of the tip of a fishing rod when there is little or no contrast between the fishing rod and the surrounding environment. This condition generally occurs when there is a low ambient light condition or when the color of the rod causes it to blend with the surrounding environment. A fish strike generally causes the tip of the fishing rod to move in an arc toward the direction of the strike and often to oscillate along an arc centered at the rod tip location prior to the strike. The length of the arc along which the tip oscillates is proportional to the force and duration of the strike. The fish strike indicator of the present invention provides a point source of high intensity light at the tip of the fishing rod, which is readily visible to the eye in normal or low ambient light conditions. By locating this high intensity light source at the tip of the rod, the arcing and oscillatory motion of the rod tip is translated into a clearly observable track by the high intensity point source of light. The length of the light track and the frequency of the oscillatory motion of the light provide indication to the fisherman of the relative force of the fish strike.

There are several advantages of the present invention over previous attempts to provide an indication of a fish strike. For example, the high intensity point of light is set in the On state once the fishing rig is cast into the water. It is always observable, indicating even very slight oscillations caused by slow strikes, as opposed to previous methods which have a mechanism to trigger turning power on to a light or audible device after a substantial strike has occurred. Also, the present invention is much simpler than prior art devices, having very few parts and no complicated mechanisms that decrease reliability. The exposed parts are not subject to corrosion or water damage and can be easily removed and stored away when not in use. The simplicity and efficiency of this invention will be more readily understood from a reading of the specification and drawings.

BRIEF DESCRIPTION OF THE DRAWINGS

FIG. 1 is an isometric view of the preferred embodiment of the present invention attached to the shaft of a fishing rod.

FIG. 2 is an exploded view of the preferred embodiment of the present invention.

DETAILED DESCRIPTION

Figure 4:
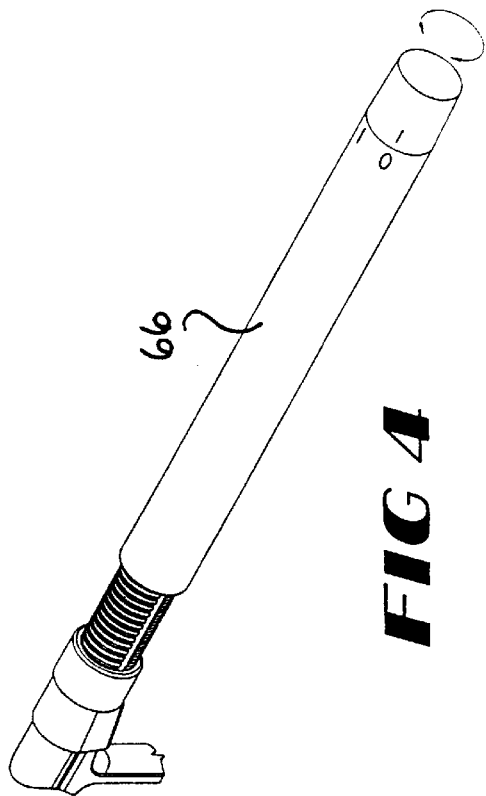
FIG. 4 is an isometric view of a portion of the shaft of a fishing pole having a removable end cap.

The lightweight, portable, fish strike indicator is used to provide a positive indication of a fish strike by visibly displaying the arcing oscillatory motion of the tip of a fishing rod resulting from the fish strike. That is, the motion of that part of the fishing rod which is generally used by fisherman to gage whether a fish has taken a bait, the tip portion, is translated into an observable track of an oscillating high intensity point source of light whose arc length and frequency of motion is proportional to the force and consistency of the strike.

Referring to the drawings, and particularly FIG. 1, the fish strike indicator of the present invention is generally indicated by numeral 10 and is shown in an isometric view attached to the shaft of a fishing rod. Portable, fish strike indicator 10 is generally comprised of a high intensity light source 12, a beam concentrator 14, an optical fiber 16, a U-shaped tip indicator 18, and multiple securing means 20. In the preferred embodiment as shown in FIG. 1, high intensity light source 12 is aligned in a parallel relationship with the longitudinal axis of fishing rod 22. Light source 12 is comprised of a light emitting end 28 and an elongated cylindrical section 30. Elongated cylindrical section 30 serves as a housing for one or more batteries which supply electrical power to a high intensity light source located in light emitting end 28 of high intensity light source 12. High intensity light source 12 is of sufficiently small diameter and weight so as to be mounted on a portion of the shaft 32 of fishing rod 22 without cumbering use of fishing rod 22. Two circular bushings 24,26 are disposed on the elongated cylindrical section 30 of light source 12. Circular bushings 24,26 each have a semicircular notch 34 on one side, which is better shown in FIG. 2. Semicircular notch 34 is of radius substantially equal to the radius of shaft portion 32 such that a portion of the circumference of shaft portion 32 is disposed in notch 34 when light source 12 is mounted on shaft portion 32. Notch 34 may also be of V-shape.

Light source 12 is secured to shaft portion 32 of fishing rod 22 by means of two securing straps 20. Each securing strap 20 is a member of a family of securing straps of varying sizes depending on where they are used to secure fish strike indicator 10 to fishing rod 22. Referring to FIG. 2, securing straps 20 are shown in at least three sizes a, b, and c. Securing strap 20 is comprised of a head 36, a tail 38, and an elongated strap section 40. Head 36, further comprises a hole 42 disposed in the center of head 36, and a cogging tooth (not shown) movable in one direction and fixed in the opposite direction disposed in hole 42. Each elongated strap section 40 of securing strap 20 has a series of transverse indentations disposed along one side (not shown) which slide over the cogging tooth in one direction when tail 38 is inserted into hole 42 of head 36. However, the transverse indentations engage the cogging tooth, which locks elongated strap section 40 and prevents movement in the opposite direction.

Disposed over the light emitting end 28 of high intensity light source 12 is a beam concentrator 14. Referring to FIG. 2, beam concentrator 14 comprises a larger end 44 and a smaller end 46 having a passage 48 disposed between ends 44 and 46 of beam concentrator 14. The diameter of large end 44 of beam concentrator 14 is substantially equal to the outer diameter of light emitting end 28 of high intensity light source 12. The diameter of smaller end 46 of beam concentrator 14 is substantially equal to the outer diameter of optical fiber 16 and is disposed over one end of optical fiber 16. Light beams from light source 12 are focused into a concentrated beam on the end of optical fiber 16 by beam concentrator 14. Beam concentrator 14 is made of a light impervious material, preferably black rubber. Large end 44 of beam concentrator 14 is easily expanded to fit in a high frictional relationship over light emitting end 28 of high intensity light source 12, and smaller end 46 of beam concentrator 14 is easily expanded to fit in a high frictional relationship on one end of optical fiber 16. Beam concentrator 14 therefore forms a light tight fit between the inner surface of large end 44 and the outer surface of light emitting end 28 of high intensity light source 12. Likewise, a light tight fit is formed between the inner surface of smaller end 46 and the outer surface of one end of optical fiber 16.

Optical fiber 16 is an elongated fiber having one end disposed at the end of passageway 48 disposed in smaller end 46 of beam concentrator 14, and extends from smaller end 46 of beam concentrator 14 to a U-shaped tip indicator 18. Optical fiber 16 transmits the concentrated light beam from smaller end 46 of beam concentrator 14 to the lower end 50 of U-shaped tip indicator 18. Optical fiber 16 is constructed such that light is transmitted longitudinally through optical fiber 16 but not substantially transverse to the outer surface of optical fiber 16. Therefore, the outer surface of optical fiber 16 does not appear to be lighted despite the longitudinal transmission of light through the fiber.

The end of optical fiber 16 distal to smaller end 46 of beam concentrator 14 is in a substantially linear relationship to lower end 50 of U-shaped tip indicator 18. U-shaped tip indicator 18 is also an optical fiber of the same material and properties as optical fiber 16. Light transmitted through optical fiber 16 is further transmitted from lower end 50 of U-shaped tip indicator 18 to upper end 52 of U-shaped tip indicator 18 providing a visible indicator at the tip portion 60 of fishing rod 22. Both optical fiber 16 and U-shaped tip indicator 18 may be formed from one continuous length of optical fiber material. U-shaped tip indicator 18 further comprises a clamping means consisting of a mounting plate 54 having a lower hole 56 and upper hole 58 disposed in mounting plate 54. Lower end 50 of U-shaped tip indicator 18 is disposed in lower hole 56 of mounting plate 54 and upper end 52 of U-shaped tip indicator 18 is disposed in upper hole 58 of mounting plate 54. Mounting plate 54 further comprises a V-shaped or semicircular notch (not shown) on its lower end. When fish strike indicator 10 is mounted on fishing rod 22, the tip portion 60 of fishing rod 22 is disposed in the notch on the lower end of mounting plate 54. Mounting plate 54 secures U-shaped tip indicator 18 to the tip portion 60 of fishing rod 22 such that upper end 52 of U-shaped tip indicator 18 is fixed in a substantially parallel relationship to the longitudinal axis of fishing rod 22 and upper end 52 is pointing towards high intensity light source 12. U-shaped tip indicator 18 further comprises a surface cover 62 disposed over the radial portion of the U to prevent light from escaping through the radial surface of the U. Due to the U-shape, light must travel around the U, which causes the light beam to perpendicularly impinge on the inner radial surface of the U. At this angle, light which would normally escape through the surface of the fiber is prevented from escaping by surface cover 62.

When in operation, the visible indicator at upper end 52 of U-shaped tip indicator 18 is a point source of high intensity light which forms a lighted track when tip portion 60 of fishing rod 22 reacts to a fish strike. The point source of light at upper end 52 of U-shaped tip indicator 18 translates the arcing and oscillatory motion of tip portion 60 of fishing rod 22 into a visible track during and after a fish strike.

The point source of high intensity light at upper end 52 of U-shaped tip indicator 18 further provides an indication of the relative force and duration of a fish strike by tracing through an arc with length and frequency of oscillation proportional to the force and duration of the fish strike.

Figure 3:
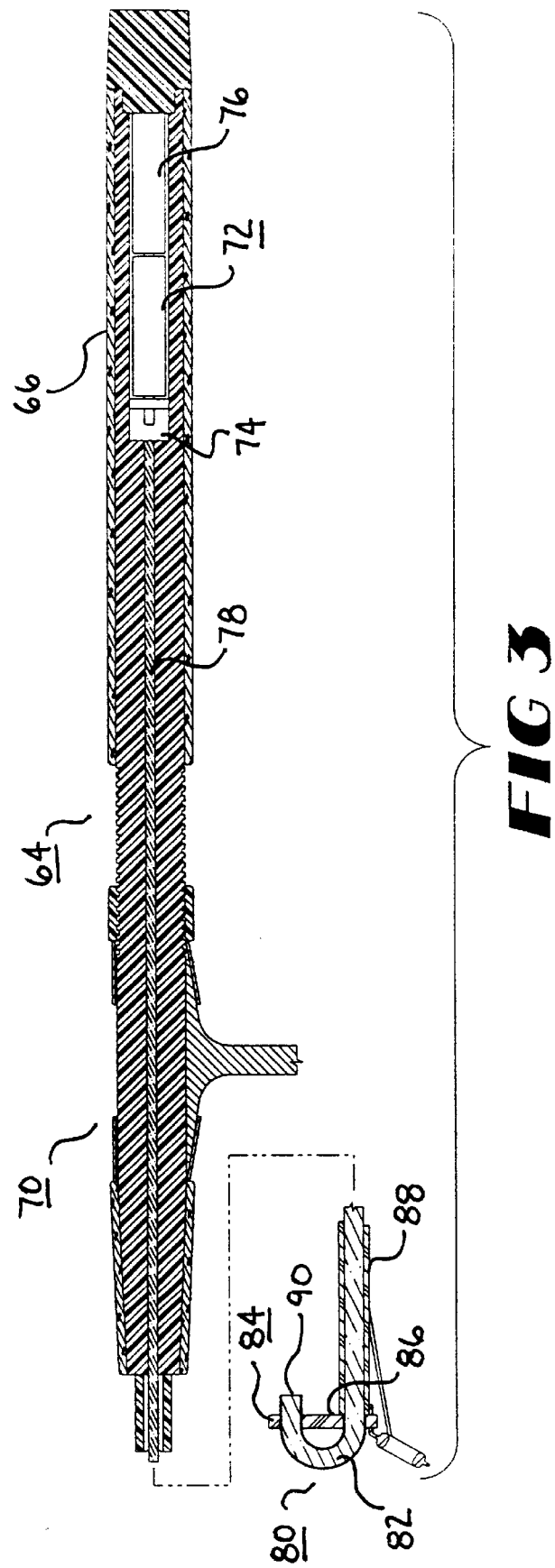
FIG. 3 is an alternate embodiment of the present invention showing a cut-away view of it embedded in the shaft of a fishing rod.

Referring to FIG. 3 and FIG. 4, an alternate embodiment of the fish strike indicator is shown generally as 64. In this embodiment, fish strike indicator 64 is embedded in the shaft portion 66 of fishing rod 70. Shaft portion 66 may have a removable end cap for easy insertion of high intensity light source 72 into shaft portion 66. High intensity light source 72 comprises a light emitting end 74 and an elongated cylindrical end 76. Optical fiber 78 extends from light emitting end 74 of high intensity light source 72 along and concentric with the longitudinal axis of fishing rod 70 to a U-shaped tip indicator 80.

U-shaped tip indicator 80 comprises a U-shaped optical fiber portion 82 and a securing means 84. Securing means 84 comprises a mounting plate 86 having an upper portion and a lower portion with upper and lower holes disposed in the respective upper and lower portions of mounting plate 86. Mounting plate 86 is attachably connected to the tip portion 88 of fishing rod 70 and holds U-shaped tip indicator 80 such that upper end 90 of U-shaped tip indicator 80 is substantially parallel to the longitudinal axis of fishing rod 70 and upper end 90 of U-shaped tip indicator 80 points toward high intensity light source 72.

Light is transmitted from light emitting end 74 of high intensity light source 72 through optical fiber 78 to U-shaped tip indicator 80. Light is further transmitted through U-shaped tip indicator 80 to upper end 90 providing a visible indicator at the tip portion 88 of fishing rod 70.

When in operation, the visible indicator at upper end 90 of U-shaped tip indicator 80 is a point source of high intensity light which forms a lighted track when tip portion 88 of fishing rod 70 reacts to a fish strike. The point source of light at upper end 90 of U-shaped tip indicator 80 translates the arcing and oscillatory motion of tip portion 88 of fishing rod 70 into a visible track during and after a fish strike.

The point source of high intensity light at upper end 90 of U-shaped tip indicator 80 further provides an indication of the relative force and duration of a fish strike by tracing through an arc with length and frequency of oscillation proportional to the force and duration of the fish strike.

The foregoing description of my invention should be limited only by the scope of the appended claims in which I claim:

1. An apparatus for signaling a fish strike comprising:

A high intensity light source having a light emitting end and an elongated cylindrical section extending from said light emitting end;

Mounting means disposed between said elongated cylindrical section of said light source and a shaft portion of a fishing rod for securing said high intensity light source in a parallel relationship to said fishing rod shaft portion;

A beam concentrator disposed over said light emitting end of said high intensity light source;

An optical fiber extending from said beam concentrator to a U-shaped rod tip fish strike indicator for transmitting light therethrough and back in the direction of said light source; and Securing means for attaching portions of said fish strike indicator to said fishing rod shaft.

2. An apparatus for signaling a fish strike as in claim 1, Wherein, said means for mounting said high intensity light source to said shaft of said fishing rod comprises:

A pair of circular bushings disposed on said elongated section of said high intensity light source; each said bushing further having a semicircular notch on one side of said bushing; and said semicircular notch being disposable on a circumference of said shaft portion of said fishing rod when said light is mounted on said shaft portion of said fishing rod.

3. An apparatus for signaling a fish strike as in claim 1, Wherein said means for securing said fish strike indicator to said shaft portion of said fishing rod comprises;

A family of securing straps having varying lengths, each said strap having a head end, a tail end, and a strap section; said head section having a cogging tooth disposed in an opening in said head; said cogging tooth movable in one direction to allow said tail end to pass through said opening in said head end in one direction, and said cogging tooth fixed in an opposite direction; said strap section further having transverse indentations along one side of said strap section; said transverse indentations slidable over said cogging tooth when said strap section moves in one direction; said cogging tooth being disposed in one said transverse indentation and locking said strap section when said strap section moves in an opposite direction; and Each said securing strap extending circumferentially around said shaft of said fishing rod and a portion of said fish strike indicator.

4. An apparatus for signaling a fish strike as in claim 1, wherein said U-shaped tip indicator comprises;

A U-shaped optical fiber portion; said U-shaped optical fiber portion being fixed in a clamping means; said clamping means being mountable on a tip end of said fishing rod and securing said U-shaped optical fiber portion, wherein, one end of said U is coupled to an end of said optical fiber distal from said beam concentrator, and a second end of said U is fixed in a parallel relationship to said shaft of said fishing rod and pointing toward said high intensity light source.

5. An method for signaling a fish strike at a tip of a fishing rod comprising:

Providing a high intensity light source emitting a light beam from a light emitting end and having an elongated cylindrical section extending from said light emitting end; said elongated cylindrical section housing one or more batteries supplying power to said light emitting end;

Providing mounting bushings disposed between said elongated cylindrical section of said high intensity light source and a shaft portion of a fishing rod;

Securing said high intensity light source to said shaft of said fishing rod;

Providing a beam concentrator having a larger end disposed over said light emitting end of said high intensity light source; said beam concentrator focusing said light beam of said high intensity light source into a concentrated beam at a smaller end of said beam concentrator;

Providing an optical fiber having one end extending from said smaller end of said beam concentrator to a second end; said second end being in linear connection with a lower end of a U-shaped tip indicator;

Providing a U-shaped tip indicator having an upper end and a lower end; said lower end of said U-shaped tip indicator in linear engagement with said second end of said optical fiber;

Securing portions of said optical fiber to said fishing rod shaft;

Securing said U-shaped tip indicator to said tip of said fishing rod; and

Transmitting said light beam from said high intensity light source through said beam concentrator, said optical fiber, and said U-shaped tip indicator, to said upper end of said U-shaped tip indicator; said light beam providing a visible indicator at said upper end of said U-shaped tip indicator at said tip of said fishing rod.

6. An method for signaling a fish strike at a tip of a fishing rod as in claim 5 further comprising:

Providing a point source of high intensity light at said tip of said fishing rod;

Translating motion of said tip of said fishing rod into a visible track; said track being translated through an arcing and oscillatory motion by said tip of said fishing rod during and after a fish strike.

7. An method for signaling a fish strike at a tip of a fishing rod as in claim 6 further comprising:

Indicating a relative force and duration of a fish strike by said track of said point source of high intensity light; said track having an arc length and frequency of oscillation proportional to said force and duration of said fish strike.

\* \* \* \* \*